US007897667B2

United States Patent
Mabry et al.

(10) Patent No.: US 7,897,667 B2
(45) Date of Patent: Mar. 1, 2011

(54) FLUORINATED POSS AS ALLOYING AGENTS IN NONFLUORINATED POLYMERS

(75) Inventors: Joseph M. Mabry, California City, CA (US); Timothy S. Haddad, Lancaster, CA (US); Sarah Anne Mazzella, Lancaster, CA (US); Sukhendu B. Hait, Hattiesburg, MS (US); Joseph J. Schwab, Huntington Beach, CA (US); Joseph D. Lichtenhan, Petal, MS (US)

(73) Assignee: Hybrid Plastics, Inc., Hattiesburg, MS (US)

( * ) Notice: Subject to any disclaimer, the term of this patent is extended or adjusted under 35 U.S.C. 154(b) by 907 days.

(21) Appl. No.: 11/725,994

(22) Filed: Mar. 19, 2007

(65) Prior Publication Data

US 2008/0221262 A1   Sep. 11, 2008

Related U.S. Application Data

(63) Continuation-in-part of application No. 10/815,544, filed on Mar. 31, 2004, now Pat. No. 7,193,015, and a continuation-in-part of application No. 09/818,265, filed on Mar. 26, 2001, now Pat. No. 6,716,919.

(60) Provisional application No. 60/459,357, filed on Mar. 31, 2003, provisional application No. 60/192,083, filed on Mar. 24, 2000.

(51) Int. Cl.
*C08K 5/24* (2006.01)

(52) U.S. Cl. ........................................ 524/269

(58) Field of Classification Search ................... 524/269
See application file for complete search history.

(56) References Cited

U.S. PATENT DOCUMENTS

| | | |
|---|---|---|
| 5,047,492 A | 9/1991 | Weidner et al. |
| 5,412,053 A | 5/1995 | Lichtenhan et al. |
| 5,484,867 A | 1/1996 | Lichtenhan et al. |
| 5,589,562 A | 12/1996 | Lichtenhan et al. |
| 5,726,247 A | 3/1998 | Michalczyk et al. |
| 5,876,686 A | 3/1999 | Michalczyk et al. |
| 5,939,576 A | 8/1999 | Lichtenhan et al. |
| 5,942,638 A | 8/1999 | Lichtenhan et al. |
| 6,075,068 A | 6/2000 | Bissinger |
| 6,100,417 A | 8/2000 | Lichtenhan et al. |
| 6,228,904 B1 | 5/2001 | Yadav et al. |
| 6,245,849 B1 | 6/2001 | Morales et al. |
| 6,329,490 B1 | 12/2001 | Yamashita et al. |
| 6,716,919 B2 | 4/2004 | Lichtenhan et al. |
| 7,193,015 B1 | 3/2007 | Mabry et al. |
| 2003/0018109 A1 | 1/2003 | Hsiao et al. |
| 2003/0050408 A1 | 3/2003 | Puhala et al. |

OTHER PUBLICATIONS

Supplemental European Search Report issued Nov. 2, 2011 for European Patent Application Serial No. 08780474.6.

*Primary Examiner* — Bernard Lipman
(74) *Attorney, Agent, or Firm* — David H. Jaffer; Pillsbury Winthrop Shaw Pittman LLP

(57) ABSTRACT

A method of using fluorinated-nanostructured POSS chemicals as alloying agents for the reinforcement of polymer microstructures, including polymer coils, domains, chains, and segments, at the molecular level. Because of their tailorable compatibility with nonfluorinated polymers, nanostructured chemicals can be readily and selectively incorporated into polymers by direct blending processes. The incorporation of a nanostructured chemical into a polymer favorably impacts a multitude of polymer physical properties. Properties most favorably improved are surface properties, such as lubricity, contact angle, water repellency, deicing, surface tension, and abrasion resistance. Improved surface properties may be useful for applications such as anti-icing surfaces, non-wetting surfaces, low friction surfaces, self cleaning. Other properties improved include time dependent mechanical and thermal properties such as heat distortion, creep, compression set, shrinkage, modulus, hardness and biological compatibility. In addition to mechanical properties, other physical properties are favorably improved, including lower thermal conductivity, dielectric properties, fire resistance, gas permeability and separation. These improved properties may be useful in a number of applications, including space-survivable materials and seals, gaskets, cosmetics, and personal care.

25 Claims, 10 Drawing Sheets

[(R$_F$SiO$_{1.5}$)n]Σn where n = 1-1,000,000

Poly POSS Oligomers

[(R$_F$SiO$_{1.5}$)$_6$]Σ$_6$     [(R$_F$SiO$_{1.5}$)$_8$]Σ$_8$     [(R$_F$SiO$_{1.5}$)$_{12}$]Σ$_{12}$

POSS Oligomer Cages

[(R$_F$SiO$_{1.5}$)$_7$(R$_F$(HO)SiO)$_1$]Σ$_8$    [(R$_F$SiO$_{1.5}$)$_4$(R$_F$(HO)SiO)$_3$]Σ$_7$    [(R$_F$SiO$_{1.5}$)$_4$(R$_F$(HO)SiO)$_4$]Σ$_8$

[(R$_F$SiO$_{1.5}$)$_6$(R$_F$(HO)SiO)$_2$]Σ$_8$    [(R$_F$SiO$_{1.5}$)$_4$(R$_F$(HO)SiO)$_2$]Σ$_6$

POSS Silanol Oligomer Cages

POSS Silanol Oligomer Fragments

Cation[(RSiO$_{1.5}$)$_8$@F]Σ$_8$

FLUORINATED POSS AS ALLOYING AGENTS IN NONFLUORINATED POLYMERS

CROSS-REFERENCE TO RELATED APPLICATIONS

This application is a continuation-in-part of U.S. patent application Ser. No. 10/815,544 filed on Mar. 31, 2004, now U.S. Pat. No. 7,193,015, (which claims the benefit of U.S. Provisional Patent Application No. 60/459,357 filed on Mar. 31, 2003), which is a continuation-in-part of U.S. patent application Ser. No. 09/818,265 filed Mar. 26, 2001, now U.S. Pat. No. 6,716,919 issued Apr. 6, 2004 (which claims the benefit of U.S. Provisional Patent Application No. 60/192,083 filed Mar. 24, 2000).

This invention was made in the performance of a Cooperative Research and Development Agreement with the Department of the Air Force. The Government of the United States has certain rights to use the invention.

FIELD OF THE INVENTION

This invention relates generally to methods for enhancing the properties of nonfluorinated thermoplastic and thermoset polymers and particulate and filler surfaces through the addition of fluorine containing POSS nanostructured chemicals. The fluorinated component may be contained inside the POSS cage, external to the POSS cage or copolymerized with POSS cages. Additionally fluorinated POSS cages may contain metal atoms to improve their compatibility with polymers and surfaces and to impart catalytic activity.

This invention also relates to processes and applications of polymeric materials and composites with improved physical properties and function that resemble those of conventional fluorinated materials. These properties and applications include improved surface properties, non-wetting, anti-icing, and low friction surfaces, biological activity, permeation control, fire retardancy, improve time-dependent mechanical properties which include (heat distortion, high temperature stability, compression set, creep, color retention, biological compatibility).

BACKGROUND OF THE INVENTION

As disclosed in U.S. Pat. No. 7,193,015, the incorporation of externally fluorinated POSS into fluorinated polymers further reduces their surface energy and contact angle rendering them super hydrophobic. It is the objective of this application to convey the ability of fluorinated POSS to impart "fluoropolymer type" characteristics to nonfluorinated polymers, metal surfaces, particulates, composites and biological systems.

It has long been recognized that the properties of polymers can be tailored to a high degree through variables such as polymer sequence, structure, additive and filler incorporation, composition, morphology, thermodynamic and kinetic processing control. It is similarly known that various sizes and shapes of fillers, and particulates (e.g. Teflon®, calcium carbonate, silica, carbon black, etc.) can be incorporated into polymers, monomer mixtures, and composites to enhance physical properties.

In their solid state all polymers (including amorphous, semi-crystalline, crystalline, and rubber, etc.) possess considerable amounts of internal and external free volume and this free volume has a tremendous impact on physical properties, since it is within this volume that the dynamic properties (e.g. reptation, translation, rotation, crystallization, interaction with surfaces and fillers) of polymer chains primarily operate and in turn influence fundamental physical properties.

The accessibility of free volume in a polymer system depends greatly on morphology and on the size of the agent desired to occupy the free volume. Thermodynamic and kinetic properties, polymer morphology and free volume dimension are major factors, which limit the ability of conventional fillers from accessing the free volume in a polymer system. Significant processing/compounding effort is normally required to force compatibilization between fillers and polymers since conventional fillers are physically larger than most polymer dimensions, chemically dissimilar, and viscometrically different than most polymers.

Prior art in nonfluoropolymers has utilize fluorinated additives and fluorinated filler particulates to impart characteristics of the fluorinated entity to the nonfluorinated polymer. Unfortunately, the prior art suffers from process complexity, inappropriate length scale of the reinforcement to access polymer free volume, or the reinforcement lacks sufficient geometrical definition to provide structural regularity and reinforcement at the molecular ($10^{-10}$ m) and nanoscopic ($10^{-9}$ m) length scales. Consequently many desirable properties of the nonfluorinated polymer are lost upon incorporation of conventional fluorinated components.

Furthermore, it has been calculated that as filler sizes decrease below 50 nm, they become more resistant to sedimentation and more effective at providing reinforcement to polymer systems. The full application of this knowledge, however, has been thwarted by the lack of a practical source of fluorinate particulates or fluorinated additives less than 50 nm and preferably with a rigid 1 nm to 5 nm size range. Particularly desirable are monodisperse, nanoscopic chemicals with precise chemical compositions, rigid and well defined geometrical shapes, and which are dimensionally large enough to provide reinforcement of polymer chains. Such nanoscopic chemicals are desirable as they form stable dispersions within polymer systems, well below the length scale necessary to scatter light and hence are visually nondetectable when incorporated. Further fluorinated nanoscopic chemicals would be chemically compatible with nonfluoropolymers and dissolve into and among the polymer chains, thus eliminating the need for the complex processing requirements of the prior art.

The fundamental premise behind this invention is underpinned mathematically through computation of the surface area and volume contribution provided at various loadings of 1 nm diameter fluorine containing nanostructured chemical entities into or onto a nonfluorinated polymeric material. Computation reveals that a fluorinated nanostructured chemical contributes more surface area and more volume as a wt % of its incorporation into a material than is possible for larger particles (see FIG. 1, FIG. 2, and FIG. 3). The net effect is that even small loadings of nanostructured chemicals can dominate the surface characteristics of a material. This is an important economic consideration since fluorinated materials are traditionally expensive and desired to be used in minimal quantities.

Further, the incorporation of fluorinated nanostructured chemicals onto the surface of a secondary material (such as $TiO_2$, $CaCO_3$, glass or mineral fillers, and fibers) can be utilized to creating more surface area on such particle and improve their compatibility with fluorinated and nonfluorinated polymers.

Recent developments in nanoscience have enabled the cost effective manufacture of commercial quantities of materials that are best described as nanostructured chemicals due to their specific chemical formula, hybrid (inorganic-organic)

chemical composition, geometrically precise and rigid shape, large physical size relative to traditional chemicals (0.3-0.5 nm), and small physical size relative to larger sized traditional fillers (>50 nm).

Nanostructured chemicals are best exemplified by those based on low-cost Polyhedral Oligomeric Silsesquioxanes (POSS) and Polyhedral Oligomeric Silicates. FIGS. 4, 5, 6 illustrate some representative examples of fluorinated nanostructured chemicals, which are also referred to as fluorinated POSS in this application. It is recognized that oligomeric, polymeric, and metal containing versions of fluorinated POSS may also be utilized. Nanostructured chemicals based on polyhedral oligomeric silsesquioxanes and polyhedral metallosesquioxanes are discussed in detail in U.S. Pat. Nos. 5,412,053; 5,484,867; 6,329,490; and 6,716,919, which are expressly incorporated herein by reference in their entirety.

SUMMARY OF THE INVENTION

As disclosed in U.S. Pat. No. 7,193,015, the incorporation of externally fluorinated POSS into fluorinated polymers further reduces surface energy and contact angles rendering them super hydrophobic. It is the objective of this application to attain control over the contact angle, coefficient of friction, and hydrophobicity of nonfluorinated polymers and filler additives and metal surfaces through the use of fluorinated POSS.

The present invention describes methods of preparing new compositions by incorporating fluorinated-nanostructured chemicals into nonfluorinated polymers. The resulting nano-alloyed polymers are wholly useful by themselves or in combination with other polymers or in combination with macroscopic reinforcements such as fiber, clay, glass, mineral and other fillers and fibers. The nano-alloyed polymers are particularly useful for producing polymeric compositions with desirable physical properties such processing aids, surface lubricity, adhesion to polymeric surfaces, composite and metal surfaces, water repellency, reduced melt viscosity, reduced surface energy, low dielectric constant, resistance to abrasion and fire, biological compatibility, optical quality plastics, cosmetic applications.

The preferred compositions presented herein contain three primary material combinations: (1) fluorinated nanostructured chemicals, fluorinated-nanostructured oligomers, or fluorinated-nanostructured polymers from the chemical classes of fluorine containing polyhedral oligomeric silsesquioxanes, polysilsesquioxanes, polyhedral oligomeric silicates, polysilicates, polyoxometallates, carboranes, boranes, and fluorinated polymorphs of carbon; (2) nonfluorinated polymer systems such as aromatic and aliphatics, semicrystalline, crystalline, glassy, elastomeric, oils, and lubricants thereof as derived from hydrocarbons, or silicones and copolymers thereof; and (3) inorganics metals, and particulate minerals and silicatious powders, and all forms of carbon including diamond powder, graphite, carbon black, tubes, spheres, mesophase, pitch, and fiber.

Preferably, the method of incorporating nanostructured chemicals into nonfluoropolymers is accomplished via blending of the fluorinated nanostructured chemicals with the nonfluorinated materials. All types and techniques of coating, blending, including melt blending, dry blending, solution blending, reactive and nonreactive blending are effective.

In addition, selective incorporation of a nanostructured chemical into a specific region of a polymer can be accomplished by compounding into the polymer a nanostructured chemical with a chemical potential (miscibility) compatible with the chemical potential of the region desired within the material. This is most preferably accomplished using POSS chemicals with partially externally fluorinated cage such as $[(RSiO_{1.5})_{8-x}(R_FSiO_{1.5})_x]\Sigma_8$ or cages containing fluorine inside of the cage cavity such as $Cation[(RSiO_{1.5})_8@F]\Sigma_8$. The internally fluorinate cages $Cation[(RSiO_{1.5})_8@F]\Sigma_8$ are particularly useful for incorporation into polar polymers (such as hydrogels because they are also polar and hence exhibit compatibility.

The physical size of POSS cages in combination with tailorable compatibility enables fluorinated POSS to be selectively incorporated into polymers, composites, metals, ceramics and biological materials to control the surface topology, surface properties, and chain dynamics and subsequently favorably impact a multitude of physical properties. Properties most favorably improved are surface properties, including contact angle, coefficient of friction, anti-icing, surface tension, hydrophobicity, and lubricity. Other properties improved include time dependent mechanical and thermal properties such as heat distortion, heat stability, creep, compression set, shrinkage, modulus, hardness, and abrasion resistance. In addition to mechanical properties, other physical properties are favorably improved, including thermal conductivity, refractive index, fire resistance, oxygen permeability, oxidative stability, electrical properties, printability and biological compatibility and activity.

DEFINITION OF FORMULA REPRESENTATIONS FOR NANOSTRUCTURES

Figure 1:
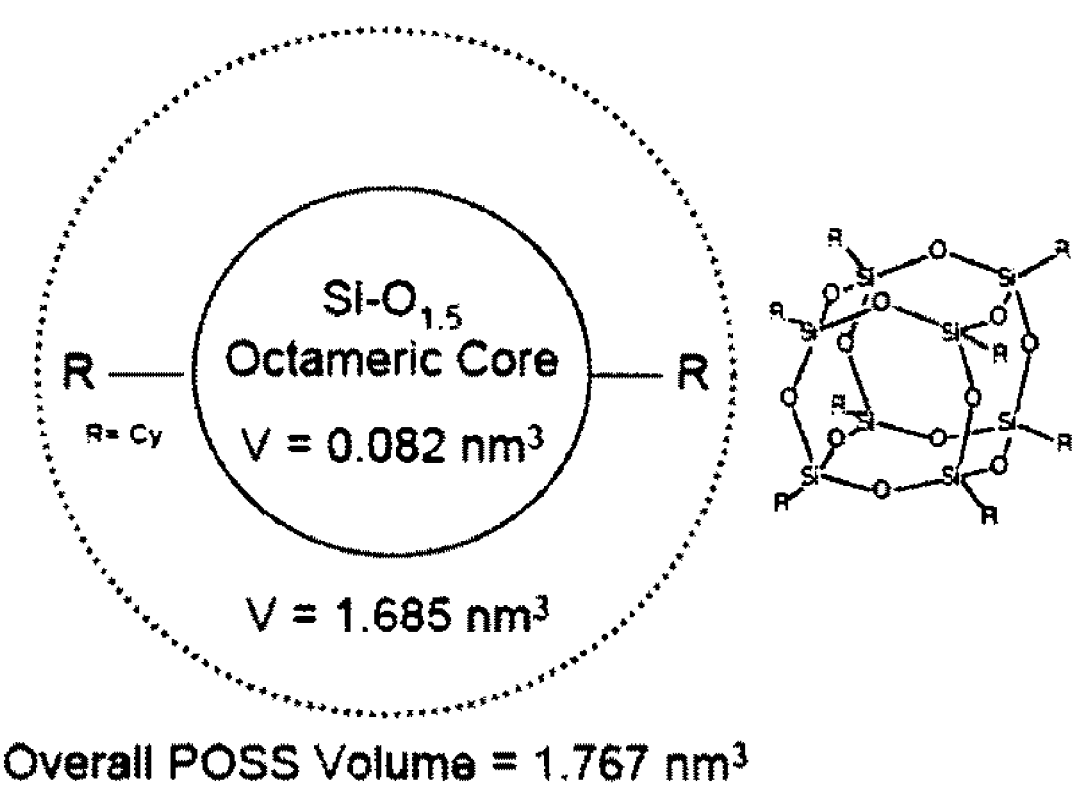
FIG. 1 illustrates diameter and volume contributions for $[(c-C_6H_{11}SiO_{1.5})_8]\Sigma_8$ POSS cage.
Figure 2:
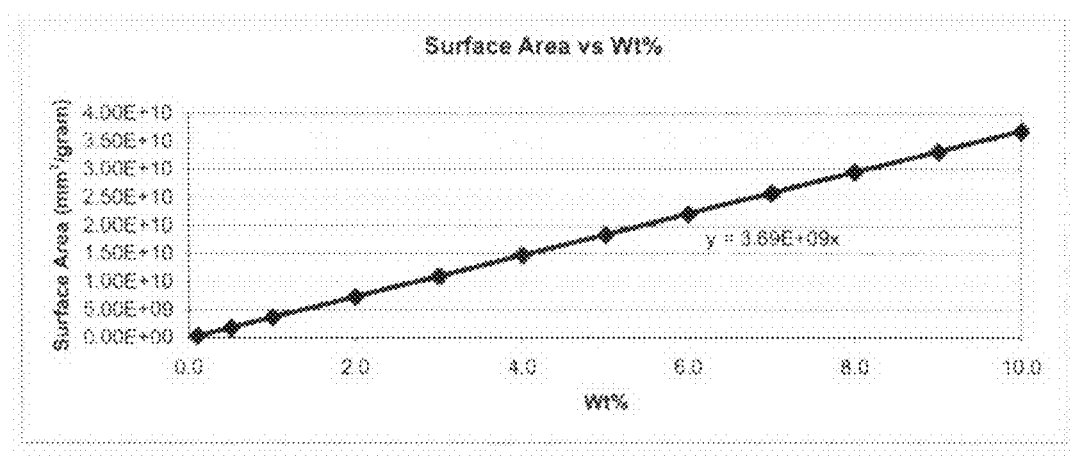
FIG. 2 illustrates the surface area contribution for $[(c-C_6H_{11}SiO_{1.5})_8]\Sigma_8$ POSS cage relative to wt % loading.
Figure 3:
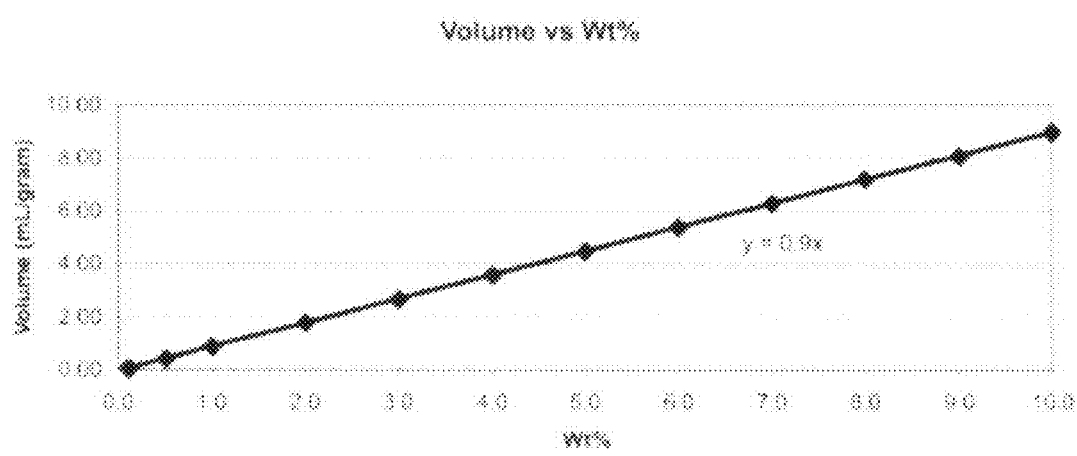
FIG. 3 illustrates the volume contribution for $[(c-C_6H_{11}SiO_{1.5})_8]\Sigma_8$ POSS cage relative to wt % loading.
Figure 4:
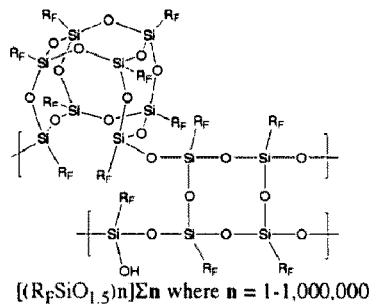
FIG. 4 illustrates representative examples of externally fluorinated POSS nanostructured chemicals.
Figure 4:
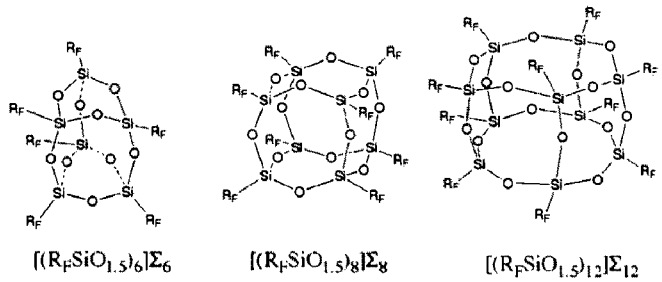
Figure 4:
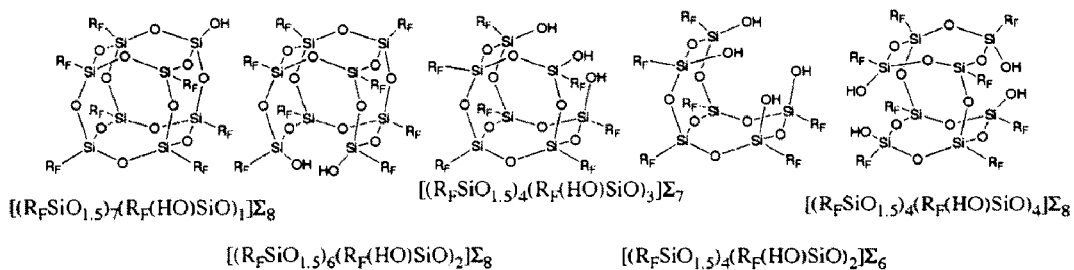
Figure 4:
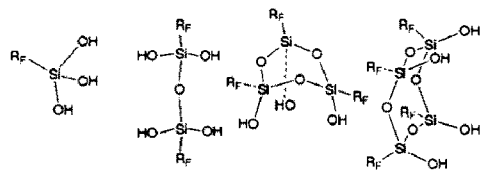
Figure 5:
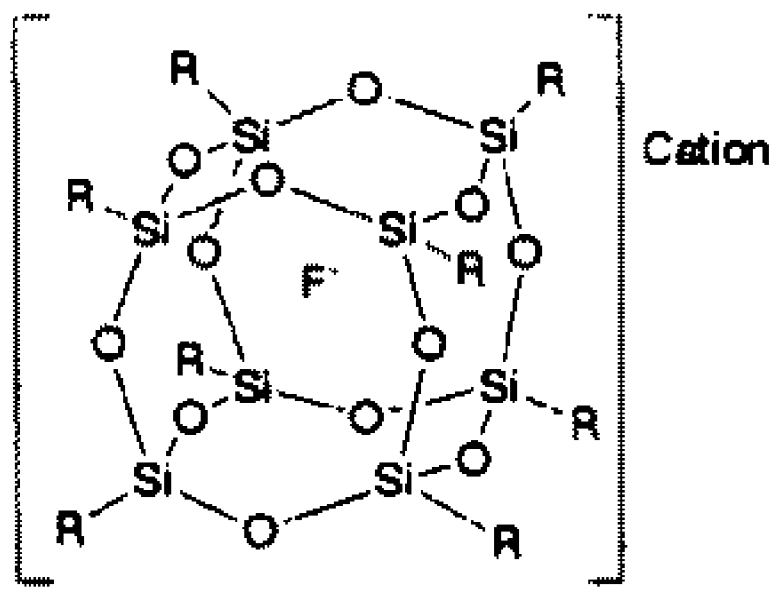
FIG. 5 illustrates representative examples of internally fluorinated POSS nanostructured chemical which also contain a counter cation to balance charge and assert additional compatibility.
Figure 6:
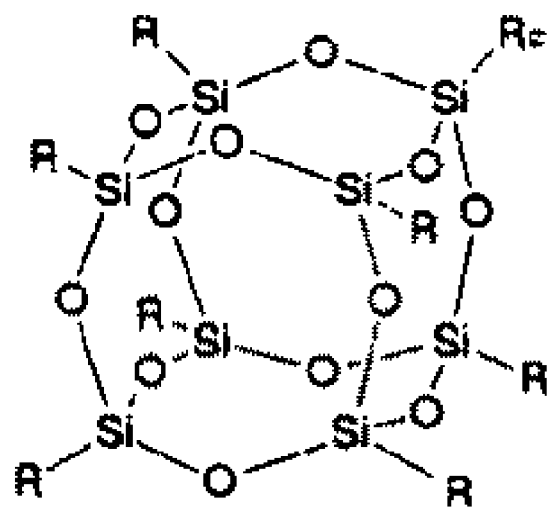
FIG. 6 illustrates a representative example of partially externally fluorinated POSS nanostructured chemical.
Figure 6:

For the purposes of understanding this invention's chemical compositions the following definitions for formula representations of Polyhedral Oligomeric Silsesquioxane (POSS) and Polyhedral Oligomeric Silicate (POS) nanostructures are made.

Polysilsesquioxanes are materials represented by the formula $[RSiO_{1.5}]_x$ where x represents molar degree of polymerization and R=represents organic substituent (H, siloxy, cyclic or linear aliphatic or aromatic groups that may additionally contain reactive functionalities such as alcohols, esters, amines, ketones, olefins, ethers and $R_F$=represents halogenated organic groups which includes fluorinated groups). Polysilsesquioxanes may be either homoleptic or heteroleptic. Homoleptic systems contain only one type of R group while heteroleptic systems contain more than one type of R group.

POSS and POS nanostructure compositions are represented by the formula:

$[(RSiO_{1.5})_n]_{\Sigma\#}$ for homoleptic compositions $[(RSiO_{1.5})_n(R'SiO_{1.5})_m]_{\Sigma\#}$ for heteroleptic compositions (where R≠R')

$[(RSiO_{1.5})_n(RXSiO_{1.0})_m]_{\Sigma E\#}$ for functionalized heteroleptic compositions (where R groups can be equivalent or inequivalent)

In all of the above R is the same as defined above and X includes but is not limited to OH, Cl, Br, I, F, alkoxide (OR), acetate (OOCR), peroxide (OOR), amine (NR$_2$) isocyanate (NCO), and R. The symbols m and n refer to the stoichiometry of the composition. The symbol Σ indicates that the composition forms a nanostructure and the symbol # refers to the number of silicon atoms contained within the nanostructure. The value for # is usually the sum of m+n, where n ranges typically from 1 to 24 and m ranges typically from 1 to 12. It should be noted that Σ# is not to be confused as a multiplier for determining stoichiometry, as it merely describes the overall nanostructural characteristics of the system (aka cage size). The symbol @ is also used in association with the POSS formula representations and indicates the presence of an F anion inside of the cage cavity.

DETAILED DESCRIPTION OF THE INVENTION

The present invention teaches the use of fluorinated POSS nanostructured chemicals as agents for imparting the characteristics of a fluorinated material (such as polymers) to nonfluorinated polymers, composites, additives, metals, and all types of particles.

The keys that enable POSS nanostructured chemicals to impart fluorinated characteristics to such a diverse number of materials are: (1) their unique size with respect to polymer chain dimensions, and (2) their ability to be compatibilized with polymer systems to overcome forces that promote incompatibility and expulsion of the nanoreinforcing agent by polymer chains and surfaces and (3) their ability to bind to dissimilar surfaces.

Additionally advantageous are the fundamental aspects of high surface area, low density, and controlled volume contributions imparted by the nanoscopic size of the POSS cage. The nanoscopic cage size imparts these properties to materials at very small loading amounts and affords POSS to dominate the surface and volume characteristics of materials.

The chemical nature of POSS cages renders their dispersion characteristics to be governed by the Gibbs free energy of mixing equation (ΔG=ΔH−TΔS) rather than kinetic dispersive mixing as for insoluble particulates. Thus the ability of POSS to interact with a surface or with polymers through Van der Waals interactions, covalent, ionic, or hydrogen bonding that can be utilized to chemically, thermodynamically, and kinetically drive their dispersion and surface modification. Furthermore since POSS cages are monoscopic in size, entropic dispersion (ΔS) is favored.

While fluoropolymers are known for their hydrophobicity, low surface energy, and low coefficients of friction, the incorporation of fluorinated POSS has been shown in U.S. Pat. No. 7,193,015 to further improve these properties in fluorinated polymers. Therefore extension of fluorinated POSS into nonfluorinated systems is a logical means for cost-effectively attaining such properties in nonfluorinated polymers.

EXAMPLES

General Process Variables Applicable to all Processes

As is typical with chemical processes there are a number of variables that can be used to control the purity, selectivity, rate and mechanism of any process. Variables influencing the process for the incorporation of nanostructured chemicals (e.g. POSS/POS etc.) into plastics include the size and polydispersity, and composition of the nanostructured chemical. Similarly the molecular weight, polydispersity and composition of the polymer system must also be matched with that of the nanostructured chemical. Finally, the kinetics, thermodynamics, and processing aids used during the compounding process are also tools of the trade that can impact the loading level and degree of enhancement resulting from incorporation of nanostructured chemicals into polymers. Blending processes such as melt blending, dry blending and solution mixing blending are all effective at mixing and alloying nanostructured chemical into plastics.

Water contact angles are a measure of surface hydrophobicity and provide insight into the free energy of the surface. Critical surface tension of the POSS, POSS polymers, and POSS blends were determined. The surface tension of the fluid is graphed in relation to its contact angle on the surface. It should be noted that a surface with a contact angle of 90° or higher is considered a "non-wetting" surface, while a surface with a contact angle below 900 is considered "wetting."

Synthesis of Internally Fluorinated CationPOSS@F Cages $(BU_4N[(PhSiO_{1.5})_8@F]_{\Sigma 8}$ (via literature Bassindale, et al Angew. Chem. Int. Ed. (2003), vol 42, 3488) Tetrabutylammonium octaphenyl octasilsesquioxane fluoride $(Bu_4N)[(PhSiO_{1.5})_8@F]_{\Sigma 8}$: Tetrabutylammonium fluoride (1 m solution in THF, 2.5 ml, with 5% water) was added to phenyl triethoxysilane (1.02 g, 4.2 mmol) dissolved in dry THF (20 ml). The mixture was stirred at room temperature for 24 h and a yellow viscous liquid obtained after removal of the solvent. Dry chloroform (10 ml) was added, and a white powder was obtained after filtration. Recrystallization from acetone afforded colorless crystals (1.25 g, 46%). $^{29}$Si NMR (79.30 MHz, CDCl$_3$, TMS): d=80.6 ppm.

$(Me)_4N[(PhSiO_{1.5})_8@F]_{\Sigma 8}$ To a 1 gram anhydrous THF (50 mL) suspension of $[(PhSiO_{1.5})_8]_{\Sigma 8}$ (0.968 mmole) was added a slight excess of anhydrous tetramethylammonium fluoride (91 mg, 0.98 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −26.5 (s) ppm. $^{29}$Si NMR (in THF) −80.7 (s) ppm.

$(Me)_4N[(ViSiO_{1.5})_8@F]_{\Sigma 8}$ To a 0.5 gram anhydrous THF (50 mL) suspension of $[(ViSiO_{1.5})_8]_{\Sigma 8}$ (0.790 mmole) was added a slight excess of anhydrous tetramethylammonium fluoride (75 mg, 0.80 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −25.5 (s) ppm. $^{29}$Si NMR (in THF) −83.0 (s) ppm.

(Me)$_4$N[(CF$_3$(CH$_2$)$_3$SiO$_{1.5}$)$_8$@F]$_{\Sigma 8}$ To a 1 gram anhydrous THF (50 mL) suspension of [(CF$_3$(CH$_2$)$_3$SiO$_{1.5}$)$_8$]$_{\Sigma 8}$ (0.816 mmole) was added a slight excess of anhydrous tetramethylammonium fluoride (76 mg, 0.82 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −28.8 (s, 1F), −69.9 (s, 24F) ppm. $^{29}$Si NMR (in THF) −70.4 (s) ppm.

(Me)$_4$N[(CF$_3$CF$_2$CF$_2$CF$_2$CH$_2$CH$_2$SiO$_{1.5}$)$_8$@F]$_{\Sigma 8}$ To a 1 gram anhydrous THF (50 mL) suspension of [(CF$_3$CF$_2$CF$_2$CF$_2$CH$_2$CH$_2$SiO$_{1.5}$)$_8$]$_{\Sigma 8}$ (0.396 mmole) was added a slight excess of anhydrous tetramethylammonium fluoride (37 mg, 0.40 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −28.8 (s, 1F), −82.4 (t, 24F), −117.2 (m, 16F), −125.4 (m, 16F), −127.1 (m, 16F) ppm. $^{29}$Si NMR (in THF) −70.1 (s) ppm.

(Me)$_4$N[(CF$_3$CF$_2$CF$_2$CF$_2$CF$_2$CF$_2$CH$_2$CH$_2$SiO$_{1.5}$)$_8$@F]$_{\Sigma 8}$ To a 1 gram anhydrous THF (50 mL) suspension of [(CF$_3$CF$_2$CF$_2$CF$_2$CF$_2$CF$_2$CH$_2$CH$_2$SiO$_{1.5}$)$_8$]$_{\Sigma 8}$ (0.295 mmole) was added a slight excess of anhydrous tetramethylammonium fluoride (28 mg, 0.30 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −30.6 (s, 1F), −84.1 (t, 24F), −119.0 (m, 16F), −124.7 (m, 16F), −125.7 (m, 16F), −126.3 (m, 16F) ppm. $^{29}$Si NMR (in THF) −70.6 (s) ppm.

(Me)$_4$N[(CF$_3$CF$_2$CF$_2$CF$_2$CF$_2$CF$_2$CF$_2$CF$_2$CH$_2$CH$_2$SiO$_{1.5}$)$_8$@F]$_{\Sigma 8}$ To a 1 gram anhydrous THF (10 mL) suspension of [(CF$_3$CF$_2$CF$_2$CF$_2$CF$_2$CF$_2$CF$_2$CF$_2$CH$_2$CH$_2$SiO$_{1.5}$)$_8$]$_{\Sigma 8}$ (0.279 mmole) was added a slight excess of anhydrous tetramethylammonium fluoride (27 mg, 0.29 mmole). After stirring under a nitrogen atmosphere for several hours the solution clarified as the product dissolves in THF. The solution was filtered through diatomaceous earth and the solvent removed under vacuum to give a quantitative yield of the salt with fluoride inside the silsesquioxane cage. $^{19}$F NMR (in THF) −28.7 (s, 1F), −82.2 (t, 24F), −117.2 (m, 16F), −122.6 (m, 16F), −122.8 (m, 32F), −123.7 (m, 16F), −124.5 (m, 16F), −127.2 (m, 16F) ppm. $^{29}$Si NMR (in THF) −70.7 (s) ppm.

Cation Exchange for CationPOSS@F Cages

The utility of F@POSS cages can be controlled through variation of the R group on the cage and through variation of the counter cation associated with the cage. Numerous advantages can be realized by exchanging nonreactive onium cations such as tetramethyl ammonium, and tetrabutyl ammonium with onium cations containing reactive groups capable of polymerization, catalytic activity, wettability, color and pigmentation properties, radiation absorbance, biological activity, or therapeutic properties. Such functional activity is highly desired for the practical utility of F@POSS.

Onium exchange can be carried out by dissolving tetramethylammonium octaphenyl octasilsesquioxane fluoride (Me)$_4$N[(PhSiO$_{1.5}$)$_8$@F]$_{\Sigma 8}$ into THF followed by addition of a stoichiometrically equivalent amount of cetyltrimethyl ammonium chloride and stirring for 10 minutes at 25° C. Then 50 ml of hexane was added to the mixture to form a second layer into which the resulting Cetyl(Me)$_3$N[(PhSiO$_{1.5}$)$_8$@F]$_{\Sigma 8}$ was extracted. Upon removal of volatiles and drying a quantitative amount of product was obtained. The Cetyl(Me)$_3$N[(PhSiO$_{1.5}$)$_8$@F]$_{\Sigma 8}$ was observed to be significantly more effective as a biocidal agent that the tetramethylammonium cation.

K[(PhSiO$_{1.5}$)$_8$@F]$_{\Sigma 8}$ Similarly, cation exchange of the onium groups on F@POSS with an inorganic cation such as K+, Na+, Li+, Ag+ is desirable as they afford higher temperature stability and do not produce a noticeable smell when heated. Onium exchange for inorganic cations was successfully accomplished for example, by addition of KPF6 to a THF solution of tetramethylammonium octaphenyl octasilsesquioxane fluoride (Me)$_4$N[(PhSiO$_{1.5}$)$_8$@F]$_{\Sigma 8}$. This mixture was allowed to stir for about 15 minutes, at which time the solution was filtered and the POSS product was isolated by filtration and the [(Me)$_4$N]$^+$PF$_6^-$ salt was retained in solution. The POSS product was collected in near quantitative yield upon removal of volatiles and evaluated with TGA and FTIR relative to the starting materials. Similar cation exchange can be carried out using other inorganic salts (e.g. AgNO3, CuSO4) in which one of the products is water soluble.

Polymerization of Fluorinated POSS Cages to [CF$_3$(CH$_2$)$_3$SiO$_{1.5}$)$_7$(propylmethacrylate)$_1$SiO$_{1.5}$)$_7$]$\Sigma_8$/methylmethacrylate Copolymers Copolymers of hepta(trifluoropropyl)propylmethylmethacrylate octamer POSS ([(CF$_3$(CH$_2$)$_3$SiO$_{1.5}$)$_7$(propylmethacrylate)SiO$_{1.5}$)$_1$]$_{\Sigma 8}$) and methylmethacrylate were prepared using the following general procedure. Under a nitrogen atmosphere, a dry, oxygen free solution of toluene (2.72 mL, 2.35 g), [(CF$_3$(CH$_2$)$_3$SiO$_{1.5}$)$_7$(propylmethacrylate)SiO$_{1.5}$)$_1$]$_{\Sigma 8}$ (300 mg, 0.245 mmol), methylmethacrylate (2702 mg, 26.99 mmol) and AIBN (11.0 mg, 0.068 mmol) was prepared and heated to 63° C. for 16 hours. This solution was then diluted with 15 mL of CHCl$_3$ and precipitated into 75 mL of methanol. After stirring overnight a white solid formed, and was collected by vacuum filtration in 85% yield and $^1$H NMR spectroscopy showed no unreacted monomers. In general it was observed that glass transition of the copolymers decreases with increasing [(CF$_3$(CH$_2$)$_3$SiO$_{1.5}$)$_7$(propylmethacrylate)SiO$_{1.5}$)$_1$]$_{\Sigma 8}$ content relative to that of methylmethacrylate and ranges from 120° C. to 130° C., while the heat capacity and thermal gravimetric performance increases with higher POSS loadings. The contact angle for a series of these copolymers is listed in Table 1.

TABLE 1

Contact angles of [CF$_3$(CH$_2$)$_3$SiO$_{1.5}$)$_7$(propylmethacrylate)$_1$SiO$_{1.5}$)$_7$]$\Sigma_8$/methylmethacrylate copolymers.

| Composition | Average Contact Angle | Standard Deviation |
|---|---|---|
| PMMA | 78.5 | 8.5 |
| 3/97 [CF$_3$(CH$_2$)$_3$SiO$_{1.5}$)$_{12}$]$\Sigma_{12}$/PMMA | 89.7 | 5.8 |
| 5/95 [CF$_3$(CH$_2$)$_3$SiO$_{1.5}$)$_{12}$]$\Sigma_{12}$/PMMA | 80.5 | 11.2 |
| 10/90 [CF$_3$(CH$_2$)$_3$SiO$_{1.5}$)$_{12}$]$\Sigma_{12}$/PMMA | 84.3 | 10.9 |
| 20/80 [CF$_3$(CH$_2$)$_3$SiO$_{1.5}$)$_{12}$]$\Sigma_{12}$/PMMA | 88.4 | 7.0 |

Synthesis of Externally Fluorinated POSS

In a 1 L volumetric flask, combine one mole of [(CF$_3$CF$_2$CF$_2$CF$_2$CF$_2$CF$_2$CH$_2$CH$_2$Si(OEt)$_3$ or [(CF$_3$CF$_2$CF$_2$CF$_2$CF$_2$CF$_2$CH$_2$CH$_2$Si(OEt)$_3$, 27.20 g was made from 100 mL of DI water and 0.774 g of 85% KOH and absolute ethanol. Transfer to a 2 L flask and stir under nitrogen for 5 days. A white precipitate forms, which is removed by vacuum filtration. The precipitate is dissolved in dichloromethane and washed three times with DI water. The solvent is removed in vacuo just until precipitate starts to form. This cloudy solution is dripped into rapidly stirring methanol yielding a fluffy white precipitate. The solid is removed by vacuum filtration. $^{29}$Si NMR (CD$_2$Cl$_2$) δ: [(CF$_3$CF$_2$CF$_2$CF$_2$CF$_2$CF$_2$CH$_2$CH$_2$SiO$_{1.5}$)$_8$@F]$_{\Sigma 8}$/ [(CF$_3$CF$_2$CF$_2$ CF$_2$ CF$_2$CF$_2$CF$_2$CH$_2$CH$_2$SiO$_{1.5}$)$_8$@F]$_{\Sigma 8}$, −66.7 ppm. Melting point [(CF$_3$CF$_2$CF$_2$CF$_2$CF$_2$CF$_2$CH$_2$CH$_2$SiO$_{1.5}$)$_8$@F]$_{\Sigma 8}$ 124° C., [(CF$_3$CF$_2$CF$_2$CF$_2$ CF$_2$CF$_2$CF$_2$CH$_2$CH$_2$SiO$_{1.5}$)$_8$@F]$_{\Sigma 8}$ 138° C. Typical yields of product range from 98-99% can be obtained at reaction concentrations of 0.1M. More concentrated preparations can also be carried out with mechanical stirring of the reaction.

Additionally fluorinated POSS cages also bearing reactive groups are desirable for surface modification of metals, fillers, and composites can be prepared. Preferred reactive groups include but are not limited to silanols, siloxides, methacrylates, thiols, amines, acids, esters, alcohols, isocyanates, epoxides, and Lewis acidic metals.

Incorporation of Fluorinated POSS Cages into Nonfluorinated Polymers.

A wide variety of fluorinated POSS cages can be prepared and potentially incorporated into polymers and the proper selection of POSS cage is dependent upon its compatibility with the desired polymer. Also of importance is the surface properties of the cage. For example fluorinated POSS cages exhibiting low surface energy, high water contact angle, with low powder density and crystal density are desired. Table 2 contains as summary of preferred systems for incorporation into polymers.

were measured after annealing for 2 hours at 140° C. (Table 3) and after annealing for 2 hours at 175° C. (Table 4).

TABLE 3

Contact angles of [CF$_3$(CH$_2$)$_3$SiO$_{1.5}$)$_{12}$]$\Sigma_{12}$ and PMMA blends annealed at 140° C.

| Composition | Average Contact Angle | Standard Deviation |
|---|---|---|
| PMMA | 74.6 | 14.3 |
| 3% [CF$_3$(CH$_2$)$_3$SiO$_{1.5}$)$_{12}$]$\Sigma_{12}$ blend | 78.2 | 4.6 |
| 5% [CF$_3$(CH$_2$)$_3$SiO$_{1.5}$)$_{12}$]$\Sigma_{12}$ blend | 87.6 | 2.1 |
| 10% [CF$_3$(CH$_2$)$_3$SiO$_{1.5}$)$_{12}$]$\Sigma_{12}$ blend | 97.4 | 3.5 |
| 20% [CF$_3$(CH$_2$)$_3$SiO$_{1.5}$)$_{12}$]$\Sigma_{12}$ blend | 100.5 | 2.6 |

TABLE 4

Contact angles of [CF$_3$(CH$_2$)$_3$SiO$_{1.5}$)$_{12}$]$\Sigma_{12}$ and PMMA blends annealed at 175° C.

| Composition | Average Contact Angle | Standard Deviation |
|---|---|---|
| PMMA | 82.1 | 12.1 |
| 3% [CF$_3$(CH$_2$)$_3$SiO$_{1.5}$)$_{12}$]$\Sigma_{12}$ blend | 82.6 | 5.25 |
| 5% [CF$_3$(CH$_2$)$_3$SiO$_{1.5}$)$_{12}$]$\Sigma_{12}$ blend | 83.3 | 2.0 |
| 10% [CF$_3$(CH$_2$)$_3$SiO$_{1.5}$)$_{12}$]$\Sigma_{12}$ blend | 90.0 | 1.3 |
| 20% [CF$_3$(CH$_2$)$_3$SiO$_{1.5}$)$_{12}$]$\Sigma_{12}$ blend | 96.5 | 3.9 |

Properties of Nonfluorinated Polymers Containing Externally Fluorinated POSS and Internally Fluorinated POSS Nonfluorinated thermoplastics were obtained from a variety of commercial suppliers. The melting and processing

TABLE 2

Selected physical properties for externally fluorinated POSS cages.

| POSS | [(CF$_3$CF$_2$CF$_2$CF$_2$CF$_2$CF$_2$CF$_2$CH$_2$CH$_2$SiO$_{1.5}$)$_8$]$_{\Sigma 8}$ | [(CF$_3$CF$_2$CF$_2$CF$_2$CF$_2$CF$_2$CH$_2$CH$_2$SiO$_{1.5}$)$_8$]$_{\Sigma 8}$ | [(CF$_3$CF$_2$CF$_2$CF$_2$CH$_2$CH$_2$SiO$_{1.5}$)$_8$]$_{\Sigma 8}$ |
|---|---|---|---|
| Critical Surface Tension | 8.68 mN/m | — | 14.98 mN/m |
| Water Contact Angle | 154° | 115° | 117° |
| Powder Density | 1.95 g/mL | 1.88 g/mL | 1.86 g/mL |
| Crystal Density | 2.06 g/mL | 2.05 g/mL | 1.98 g/mL |

The incorporation of [CF$_3$(CH$_2$)$_3$SiO$_{1.5}$)$_{12}$]$\Sigma_{12}$ into commercial grade PMMA (polymethylmethacrylate) was accomplished by solution blending and melt blending with POSS weight percents of 3%, 5%, and 10% and 20% respectively. The resulting formulations were subsequently heated to 140° C. to anneal the systems and secondarily heated at 175° C. until optically clear. The water contact angle was measured after each heat treatment to determine the impact on contact angle. Incorporation of the [CF$_3$(CH$_2$)$_3$SiO$_{1.5}$)$_{12}$]$\Sigma_{12}$ resulted in an increase of contact angle and corresponding increase in hydrophobicity and surface energy reduction of the formulation. Increasing the hydrophobicity of PMMA is highly desirable as water absorption by PMMA is well known to reduce its durability and aesthetics for signage, utensils and optical applications. PMMA is widely utilized in dental and prosthetic application, paints, adhesives, and coatings in which the uptake of moisture causes degradation of mechanical properties. The contact angles for a series of these blends temperature for each polymer was determined by differential scanning calorimetry (DSC). Externally and internally fluorinated POSS were prepared as described. A general method for incorporation of the POSS into the thermoplastic polymer utilized a twin screw extruder (MicroCompounder, DACA Instruments) and compounding of the polymer and POSS thoroughly until a steady-state of mixer torque was observed.

Thermosetting polymers can similarly be utilized in which the POSS is incorporated via both high and low shear mixing and copolymerization. The preferred method is dependent upon the visual homogenization of the system and the viscosity of the initial resin mixture.

In general the incorporation of externally fluorinated and internally fluorinated POSS was effective at increasing the hydrophobicity of the polymers into which it was incorporated.

Figure 7:
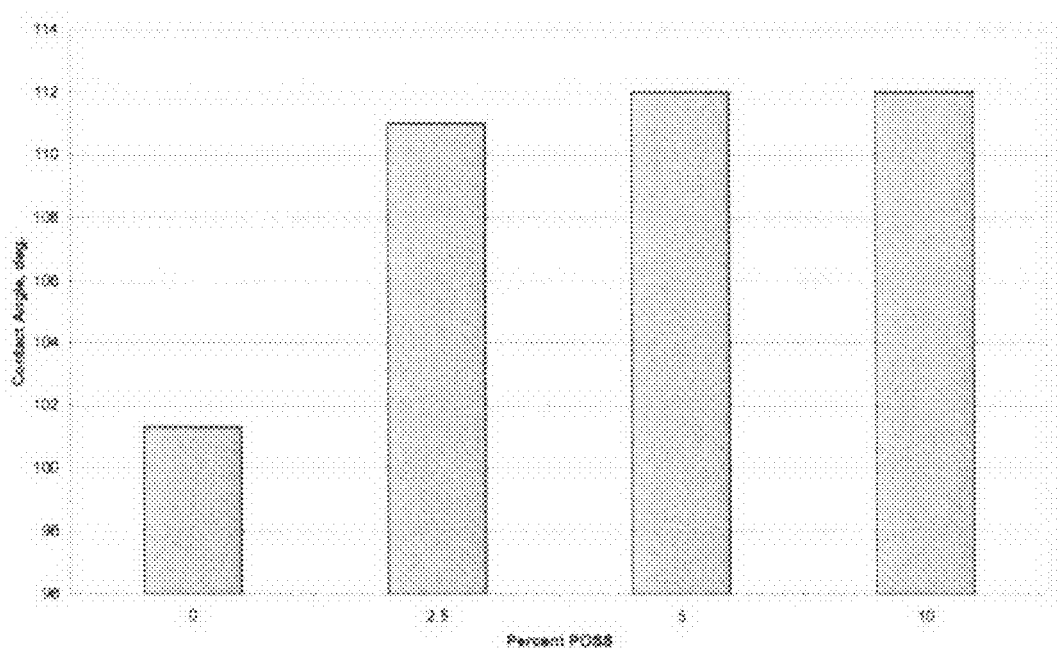
FIG. 7 illustrates the contact angles for polystyrene showing increasing contact angle with $[(CF_3(CF_2)_7(CH_2)_2SiO_{1.5})_8]\Sigma_8$ POSS incorporation.
Figure 8:
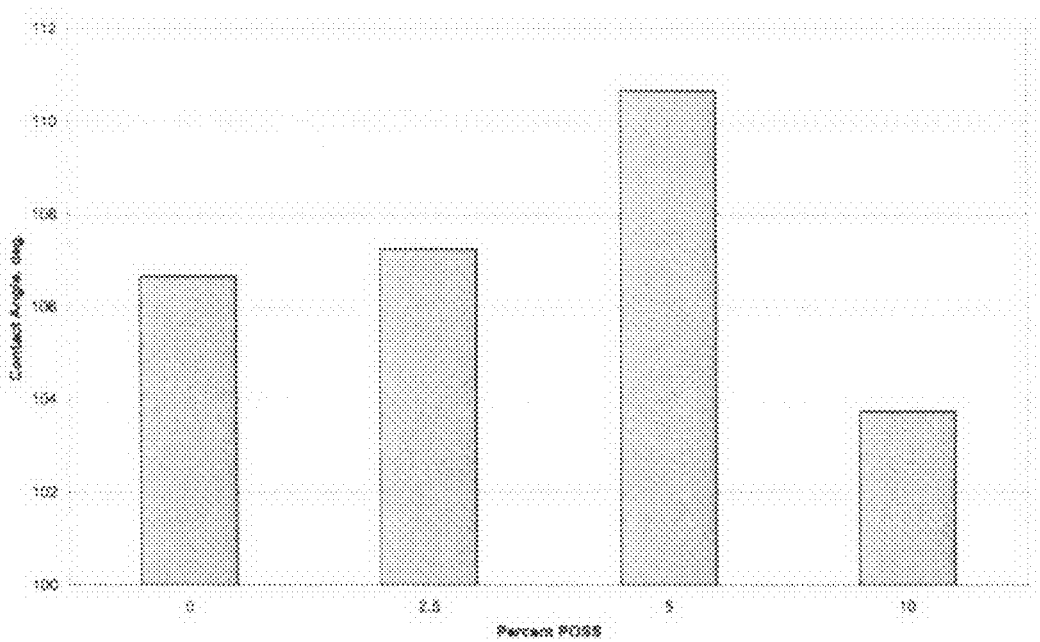
FIG. 8 illustrates the contact angles for LDPE showing increasing contact angle with $[(CF_3(CF_2)_7(CH_2)_2SiO_{1.5})_8]\Sigma_8$ POSS incorporation.
Figure 9:
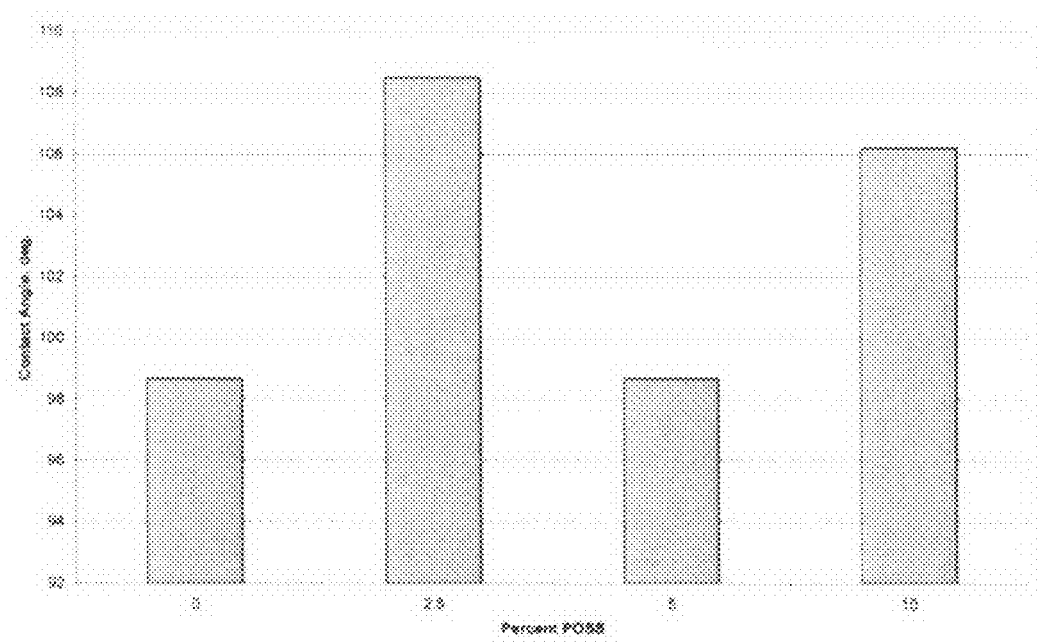
FIG. 9 illustrates the contact angles for styrene acrylonitrile showing increasing contact angle with $[(CF_3(CF_2)_7(CH_2)_2SiO_{1.5})_8]\Sigma_8$ POSS incorporation.
Figure 10:
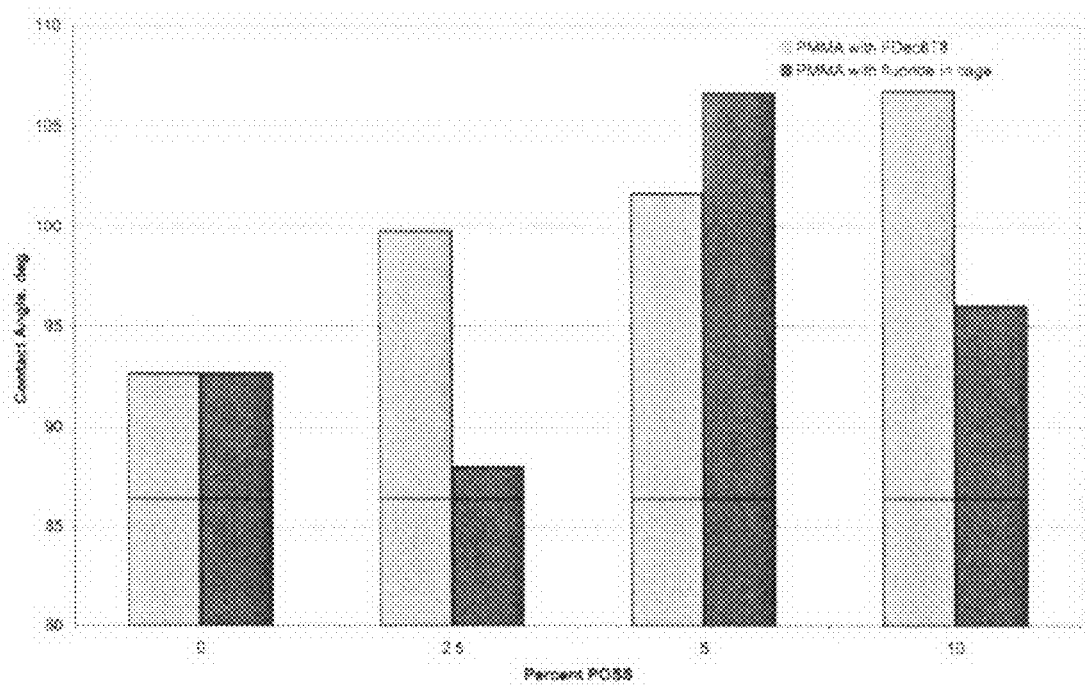
FIG. 10 illustrates the contact angles for polymethylmethacrylate showing increasing contact angle with $[(CF_3(CF_2)_7(CH_2)_2SiO_{1.5})_8]\Sigma_8$ and $(CH_3)_4N[(CF_3(CF_2)_7(CH_2)_2SiO_{1.5})_8@F]\Sigma_8$ POSS incorporation.

Examples provided in FIGS. 7-10 illustrate trends for the enhancement and are not intended to represent limitations on the scope, range or utility, or effectiveness of the method. It is realized that differing degrees of hydrophobicity are required for specific applications along with other desirable properties such as mechanical, thermal, biological, optical, processing, and finish properties.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of alloying an internally fluorinated nanostructured chemical selected from the group consisting of POSS cages containing a fluorine ion inside the cage and POS cages containing a fluorine ion inside the cage into a nonfluoropolymer, comprising the step of compounding the internally fluorinated nanostructured chemical into the polymer.

2. A method according to claim 1, wherein a mix of different nanostructured chemicals is blended into the polymer.

3. A method according to claim 1, wherein the nonfluorinated polymer is in a physical state selected from the group consisting of oils, amorphous, semicrystalline, crystalline, elastomeric, rubber, and crosslinked materials.

4. A method according to claim 1, wherein the nonfluorinated polymer contains a chemical sequence and related polymer microstructure.

5. A method according to claim 1, wherein the polymer is a polymer coil, a polymer domain, a polymer chain, a polymer segment, or mixtures thereof.

6. A method according to claim 1, wherein the nanostructured chemical reinforces the nonfluorinated polymer at a molecular level.

7. A method according to claim 1, wherein the nanostructured chemical contributes to volume of the polymer.

8. A method according to claim 1, wherein the nanostructured chemical contributes to surface area of the polymer.

9. A method according to claim 1, wherein the compounding is nonreactive.

10. A method according to claim 1, wherein the compounding is reactive.

11. A method according to claim 1, wherein a physical property of the nonfluorinated polymer is improved as a result of incorporating the nanostructured chemical into the polymer.

12. A method according to claim 11, wherein the physical property comprises a member selected from the group consisting of lubricity, contact angle, water repellency, adhesion to a polymeric surface, adhesion to a composite surface, adhesion to a metal surface, water repellency, density, low dielectric constant, thermal conductivity, glass transition, viscosity, melt transition, storage modulus, relaxation, stress transfer, abrasion resistance, tire resistance, biological compatibility, gas permeability, and porosity.

13. A method according to claim 1, wherein the compounding step is accomplished by blending the nanostructured chemical into the polymer.

14. A method according to claim 1, wherein the compounding step is accomplished by a blending process selected from the group consisting of melt blending, dry blending, and solution blending.

15. A method according to claim 1, wherein the nanostructured chemical functions as a plasticizer.

16. A method according to claim 1, wherein the nanostructured chemical functions as a filler.

17. A method according to claim 1, wherein the nanostructured chemical functions as both a plasticizer and a filler.

18. A method according to claim 1, wherein the nanostructured chemical is selectively compounded into the polymer such that the nanostructured chemical is incorporated into a predetermined region within the polymer.

19. A polymer composition produced by a method according to claim 1.

20. The method of claim 1, wherein the compounding allows control of the molecular motion of the polymer.

21. A method according to claim 20, wherein a time dependent property is enhanced as a result of compounding the nanostructured chemical into the polymer.

22. A method according to claim 21, wherein the time dependent property is selected from the group consisting of $T_g$, HDT, modulus, creep, set, permeability, erosion resistance, abrasion resistance.

23. The method of claim 1, wherein the nanostructured chemical is selected to have chemical properties compatible with a selected region of the polymer, and thereby reinforces a selected region of the polymer.

24. The method of claim 1, further comprising the step of blending the nanostructured chemical with a particulate material.

25. The method of claim 24, wherein the particulate material is selected from the group consisting of metals, minerals, silicatious powders, and carbon.

* * * * *